W. HODGES.
Fertilizer-Distributer.

No. 216,678. Patented June 17, 1879.

WITNESSES:
W. W. Hollingsworth
Amos W. Hart

INVENTOR:
Wm. Hodges
BY
ATTORNEYS.

UNITED STATES PATENT OFFICE.

WILLIAM HODGES, OF OKOLONA, MISSISSIPPI, ASSIGNOR TO HIMSELF AND JOHN F. HODGES, OF SAME PLACE.

IMPROVEMENT IN FERTILIZER-DISTRIBUTERS.

Specification forming part of Letters Patent No. 216,678, dated June 17, 1879; application filed April 15, 1879.

*To all whom it may concern:*

Be it known that I, WILLIAM HODGES, of Okolona, in the county of Chickasaw and State of Mississippi, have invented a new and useful Improvement in Fertilizer-Distributers; and I do hereby declare that the following is a full, clear, and exact description of the same.

The invention is an improvement in the class of machines whose hoppers have hinged movable ends that are connected with a rotatable shaft or roller, so that they may be drawn inward for the purpose of aiding the discharge of the fertilizer.

The invention relates to the construction and combination of parts, as hereinafter described.

Figure 1:
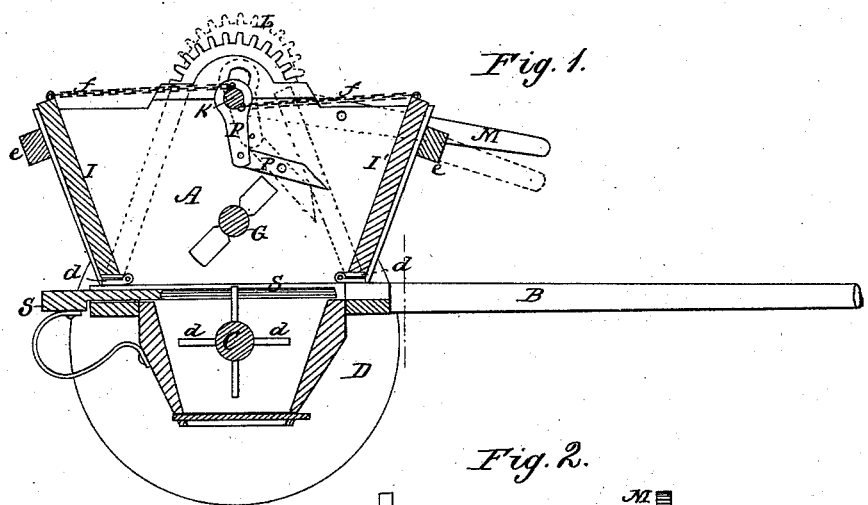
Figure 2:
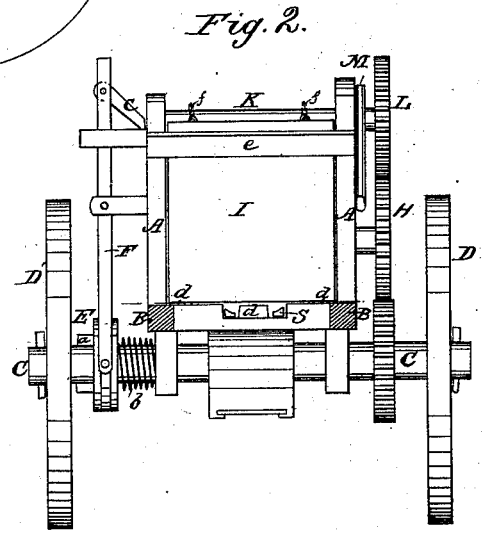
Figure 3:
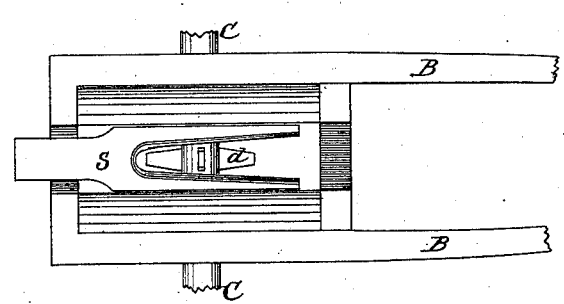

In the accompanying drawings, forming part of this specification, Figure 1 is a vertical longitudinal section of the machine. Fig. 2 is an end view with part in section. Fig. 3 is a detail horizontal section.

The hopper A and shafts B are rigidly secured on the axle C of transporting-wheels D D'. Said wheels are loose on the axle, but one of them, D', may be locked or rigidly secured thereto by means of a clutch, E, and lever F.

The clutch is formed of a bar or feather, $a$, which slides in a lengthwise groove in the axle, and enters a notch in wheel D' when forced outward by the spring $b$.

To hold the feather retracted against the stress of the string, the lever F is provided with a pawl, $c$.

The axle C has radial arms $d$, which work in the space or slot in the bottom of the hopper and assist in discharge of the fertilizer.

In the middle of the hopper is a transverse armed shaft or agitator, G, which is rotated by gear-connection H with axle C.

The ends I I' of the hopper are loosely hinged at the lower end, being preferably attached to the bottom of the hopper by means of short hinges or straps $d\ d$. The upper portions of the ends I I' rest against and are prevented from falling outward by cross-bars $e\ e$, but are entirely free to move inward or toward the middle of the hopper. To draw them inward or toward each other, chains or straps $f f$ are attached to their upper ends and to the rotatable roller or shaft K, which has its bearings in the sides of the hopper. A spur-gear, L, is affixed to one end of said roller K, whose contiguous bearing is so constructed as to permit free vertical movement of that end of the roller. The object of this movement is to bring the gear L into or out of mesh with gear H on the agitator-shaft G, as required. The device employed for effecting this result is a hand-lever, M, which extends forward from the gear end of the roller K into convenient proximity to the position occupied by the driver.

It will be perceived that if the clutch E be allowed to connect the wheel D' and axle C, they will rotate together as the machine advances, and thus rotation will be imparted to spur-gear H.

When the fertilizer has been partly discharged, the lever M may be raised to throw the gear L into mesh with H, and thereby cause the rotation of the axle to impart like motion to the roller K, thereby winding the straps $d\ d$ around the latter and drawing the upper portions of the ends I I' of the hopper toward each other. The effect will be to force the mass of the fertilizer toward the middle of the hopper, and at the same time scrape the sides of the latter or remove such portion of the fertilizer as may adhere thereto. The fertilizer will thus be crowded around the agitator G, and into and around the opening in the bottom of the hopper, so that the discharge of the entire contents of the latter is ultimately effected.

It is apparent that the rotation of the roller K must be arrested when the ends I I' have been drawn inward to a certain limit, and to do this the gears L H must be thrown out of mesh. This is effected automatically by a jointed lever, P, which is pivoted to the inner side of the hopper, and which is tilted to raise the free or gear end of the roller K, when the end I' comes in contact with it, as will be readily understood on reference to dotted lines, Fig. 1.

The true bottom of the hopper is recessed or grooved lengthwise to receive a forked slide, S, which may be adjusted endwise to narrow or enlarge the size of the discharge-opening in the hopper, and thus regulate the amount of fertilizer discharged in a given time by diminishing or increasing the size of the opening.

I do not claim a fertilizer-distributer having hinged movable ends, nor a slotted slide for governing the discharge of the fertilizer.

What I claim is—

The combination, with the hinged ends of the hopper, the roller or shaft K, the chains, and the gears which communicate motion from the axle to the shaft, of the jointed lever arranged on the inner side of the hopper and connected with the vertically-movable end of said shaft, substantially as shown and described, for the purpose of automatically throwing the shaft out of gear with the axle, as specified.

WILLIAM HODGES.

Witnesses:
J. M. HIGHTOINER,
W. A. BODENHAMER.